(12) United States Patent
Tanji

(10) Patent No.: US 6,702,219 B2
(45) Date of Patent: Mar. 9, 2004

(54) SEATBELT RETRACTOR

(75) Inventor: Hiromasa Tanji, Kyoto (JP)

(73) Assignee: Takata Corporation, Tokyo (JP)

( * ) Notice: Subject to any disclaimer, the term of this patent is extended or adjusted under 35 U.S.C. 154(b) by 210 days.

(21) Appl. No.: 10/025,863

(22) Filed: Dec. 26, 2001

(65) Prior Publication Data

US 2002/0096591 A1 Jul. 25, 2002

(30) Foreign Application Priority Data

Jan. 22, 2001 (JP) ........................................ 2001-012886

(51) Int. Cl.⁷ ............................................. B65H 75/48
(52) U.S. Cl. ................................................... 242/390.8
(58) Field of Search .............................. 242/374, 390.8, 242/390.9; 280/806, 807; 297/478

(56) References Cited

U.S. PATENT DOCUMENTS

| | | | |
|---|---|---|---|
| 5,232,177 A | * | 8/1993 | Hibata |
| 5,529,258 A | * | 6/1996 | Dybro et al. ............... 242/374 |
| 5,769,345 A | * | 6/1998 | Morner et al. |
| 6,076,757 A | * | 6/2000 | Holzapfel .................... 242/374 |
| 6,427,935 B1 | * | 8/2002 | Fujii et al. ............... 242/390.9 |
| 6,499,554 B1 | | 12/2002 | Yano et al. |

* cited by examiner

Primary Examiner—William A. Rivera
(74) Attorney, Agent, or Firm—Kanesaka & Takeuchi

(57) ABSTRACT

In a seatbelt retractor having a motor, a belt winding spool, and a switching mechanism that turns on and off a power transmission route between the motor and the spool, the switching mechanism includes a device that connects the power transmission route between the motor and the spool only when the motor rotates in the retracting direction. A ratchet mechanism allows the spool to rotate only in the retraction direction during the emergency operation, while allowing the spool in any directions in the normal operation. The resultant locking mechanism can be rapidly operated upon occurrence of an emergency, while the seatbelt retractor will not cause uncomfortable feeling or unpleasantness due to unnecessary locking when an occupant tries to withdraw the seatbelt.

11 Claims, 16 Drawing Sheets

SEATBELT RETRACTOR

BACKGROUND OF THE INVENTION AND RELATED ART STATEMENT

The present invention relates to a seatbelt retractor for use in a passenger car, etc., in order to ensure the safety of vehicle occupants.

A seatbelt retractor must be installed in order to secure the safety of a vehicle occupant upon an accident such as collision, and various types thereof have been developed. An example of the simplest structure thereof is shown in FIG. 16.

A spring cover 41, which is a supporter at one side of the seatbelt retractor, is provided with a bearing 41a arranged therein, into which a shaft 42a of a spool 42 is fitted so as to rotate while a force in the retracting direction is applied to the shaft 42a by a spring. A seatbelt is wound around the spool 42.

Inside the spool 42, a concave fitted portion (not shown) is formed, into which one end of a torsion bar 43 is fitted. The other end of the torsion bar 43 is fitted into a concave fitted portion (not shown) formed in a locking base 44. A shaft 44a of the locking base 44 passes through a hole 45a of a lock gear 45 so as to fit into a bearing (not shown) of a retainer 46, which is a supporter on the other side of the seatbelt retractor.

Such a mechanism results in supporting the spool 42 at its rotating shaft by the spring cover 41 and the retainer 46 and rotating the spool 42 so as to retract the seatbelt by means of the spring. The spring cover 41 and the retainer 46 are fixed at both ends of a base frame 48, so that the spool 42 is accommodated within the base frame 48.

In these structural elements, the locking base 44 and the lock gear 45 are rotatable by a predetermined angle, so that the lock gear 45 is urged by a spring 49 relative to the locking base 44 in the direction pulling out or withdrawing the seatbelt so as to approach the limit of the relative rotation.

When the seatbelt is withdrawn in a normal state, since there is no rotational resistance against the lock gear 45, the lock gear 45 can not overcome the urging force of the spring 49. As a result, the lock gear 45 rotates integrally with the locking base 44.

Even when the locking base 44 is rotated in the withdrawing direction as the spool 42 is rotated by the spring force, the lock gear 45 rotates integrally with the locking base 44 because the lock gear 45 is designed to approach the limit of the rotation relative to the locking base 44 in this direction as mentioned above.

When abrupt retraction force to the seatbelt is produced due to a collision or the likes, a flywheel 50 accommodated within the lock gear 45 is displaced by overcoming the urging force of a spring 51, so that the lock gear 45 can not rotate relative to the retainer 46, thus of the seatbelt being stopped.

Then, the rocking base 44 rotates relative to the lock gear 45 against the urging force of the spring 49. A mechanism is constructed such that a pawl 52 accommodated in the locking base 44 is protruded outside by this relative rotation, and a gear of the externally protruded pawl 52 is brought into engagement with a gear section 48a formed in the base frame 48, also stopping the rotation of the locking base 44.

Accordingly, rotation of the torsion bar 43 is also stopped and the spool 42 is allowed to rotate only by an angle corresponding to a twist of the torsion bar 43. Therefore, the spool 42 is thereafter rotated under a tension increasing as the seatbelt is withdrawn. The locking mechanism described above is generally called as "a locking mechanism by a web sensor".

The description above only illustrates an outline of the seatbelt retractor and there are complex mechanisms for use as a mechanism for stopping the rotation of the lock gear 45 by the movement of the flywheel 50 and a mechanism for protruding the pawl 52 outside, for example. However, the seatbelt retractor is known and in common use, so that more detailed description may not be necessary for those skilled in the art, and moreover, it is irrelevant to the principal part of the present invention, so that the more detailed description is omitted.

However, in the conventional seatbelt retractor, since the lock mechanism is operated after the seatbelt is actually withdrawn suddenly, a time lag in operating the lock mechanism may be developed. There is also a problem that when the seatbelt is withdrawn in a state that a motor shaft is connected to the spool, a force for withdrawal or retraction is required and a force for retracting the seatbelt is not sufficient. Furthermore, when the seatbelt is rapidly withdrawn during wearing the seatbelt, the lock mechanism may also be operated. This results in for an occupant feeling uncomfortable or unpleasantness.

The present invention has been made in view of such situations, and it is an object of the present invention to provide a seatbelt retractor which can promptly operate a lock mechanism upon an emergency.

It is another object of the invention to provide a seatbelt retractor which eliminates uncomfortable feeling or unpleasantness to an occupant caused by unnecessary operation of locking mechanism upon wearing the seatbelt without reducing the retractor efficiency.

SUMMARY OF THE INVENTION

In order to solve the problems described above, a seatbelt retractor has a mechanism for retracting a seatbelt by a motor. The seatbelt retractor comprises a switching mechanism for switching on and off a power transmission route between the motor and a spool around which the seatbelt is wound, in which the power transmission route between the motor and the spool is connected only when the motor rotates in the retracting direction, and a ratchet mechanism in which, during operation, the spool rotates only in the seatbelt-retraction direction and during non-operation, the spool is allowed to rotate in any directions (the first aspect).

In the mechanism, when the motor does not rotate in the retracting direction, the power transmission route between the motor and the spool is not connected by the switching mechanism of the power transmission route. Therefore, the mechanical power transmission between the motor and the spool is not performed. At this time, by turning the ratchet mechanism off, the spool can freely rotate without any load applied thereto by the motor and rotational disturbance by the ratchet mechanism. Accordingly, the seatbelt is retracted only by a retracting force due to the spring torque, so that a vehicle occupant will not feel uncomfortable.

When a collision detecting device attached to a vehicle detects abrupt braking, a large acceleration, and so forth so as to determine that there is a possible collision, the device sends a signal to the motor to retract the seatbelt simultaneously with putting the ratchet mechanism into an operating state. Then, the power transmission route between the motor and the spool is connected by the switching mechanism of the power transmission route, so that the spool is rotated by the winding force of the motor so as to retract the seatbelt. Due to operation of the ratchet mechanism, the spool rotates only in the seatbelt-retraction direction but not in the seatbelt-withdrawing direction, enabling a vehicle occupant to be securely restrained to a seat.

A seatbelt retractor can be equipped with a switching mechanism of a power transmission route which is driven by a rotational force of a motor in the seatbelt-retraction direction so as to connect the power transmission route between the motor and the spool having the seatbelt wound therearound.

In the first aspect, turning on (connection) and off (disconnection) the power transmission route is operated by the rotational torque of the motor, so that an actuator driven by the other power for operating the switching mechanism of the power transmission route, such as an electromagnetic solenoid, is not required. Therefore, the switching mechanism of the power transmission route cab be comprised of the smaller number of parts, and a simplified structure and cost reduction can be achieved.

In the second aspect, in a seatbelt retractor of the first embodiment, the power transmission route is provided with a power transmission gear mechanism while the switching mechanism of the power transmission route has a rotatable control lever for controlling operation of the switching mechanism of the power transmission route, so that the switching mechanism of the power transmission route is operated by rotation of the control lever due to the rotational torque of the motor so as to establish the power transmission route in a connected state.

In the second aspect, when the motor rotates in the retracting direction, the control lever is rotated by the motor torque so as to operate the switching mechanism of the power transmission route to enable the power transmission between the motor and the spool. When the motor does not rotate, the control lever is located at its initial position so as not to operate the switching mechanism of the power transmission route, so that the power transmission between the motor and the spool is disconnected and the spool can rotate freely. Therefore, the turning on and off the power transmission between the motor and the spool can be performed by a simplified structure.

As the third aspect of the invention, the power transmission route is provided with a mechanism that reduces rotation of the motor in speed from the power transmission gear mechanism so as to transmit it to the spool. The reduction mechanism comprises a sun gear, a ring-shaped internal gear having ratchet teeth at the external periphery and internal teeth on the internal circumference, planetary gears engaging the sun gear and the internal gear, a carrier for supporting the planetary gears simultaneously with transmitting revolution of the planetary gears to the spool, and a reduction gear disposed to rotate integrally with the sun gear, in which rotation of the motor is input from the power transmission gear mechanism.

The switching mechanism of the power transmission route further comprises a retaining lever that can rotate between a position disengaged from ratchet teeth and a position engaged with the ratchet teeth. In a normal state in which the control lever does not rotate, the retaining lever is put at the non-engaging position so as to allow the internal gear to rotate, and when the control lever rotates, the retaining lever is put at the engaging position so as to prevent the internal gear from rotation by engagement between the ratchet teeth and the retaining lever. When the internal gear can rotate, the power transmission route is established to be in a disconnected state, and when the internal gear is prevented from rotation, the power transmission route is established to be in a connected state.

In the third aspect, when the retaining lever is not engaged with the ratchet teeth, the internal gear can rotate without substantial load. When the motor rotates in this state, the reduction gear and the sun gear are rotated. Then, because the internal gear can rotate without substantial load while revolution of the planetary gears is subjected to the load of the spool, the planetary gears do not revolve and each planetary gear rotates on its axis so as to rotate the internal gear. Therefore, the motor power can not be transmitted to the spool.

When the spool rotates in this state, although the planetary gears revolve, the sun gear is subjected to the motor load while the internal gear has no load, so that the planetary gears revolve while rotating the internal gear but not rotating the sun gear. The power transmission between the spool and the motor is disconnected, so that the retraction and withdrawal of the seatbelt can be freely performed without receiving the motor load.

When the retaining lever is engaged with the ratchet teeth, the internal gear is prevented from rotating. When the motor rotates in this state, the reduction gear and the sun gear are rotated. Then, since the internal gear can not rotate, the planetary gears are rotated on their axes by the sun gear simultaneously with receiving a revolving force from the internal gear so as to revolve. Therefore, the spool connected to the internal gear rotates by receiving a driving force. At this time, when the spool rotates, the sun gear is also subjected to the driving force by revolving of the internal gear, so that the motor receives the driving force. Thus, the power transmission route between the spool and the motor is connected.

As the fourth aspect of the invention, the power transmission route is provided with a reduction mechanism for reducing rotation of the motor in a speed from the power transmission gear mechanism so as to transmit it to the spool. The reduction mechanism comprises a sun gear, a ring-shaped internal rotation gear having ratchet teeth at the external circumference and internal teeth on the internal circumference, planetary gears engaging the sun gear and the internal gear, a carrier for supporting the planetary gears simultaneously with transmitting rotation of the motor to the spool, and a reduction gear disposed to rotate integrally with the sun gear and to transmit the rotation thereof to the spool.

The switching mechanism of the power transmission route further comprises a retaining lever that can rotate between a position disengageable from the ratchet teeth and a position engageable with the ratchet teeth. In a normal state in which the control lever does not rotate, the retaining lever is put at the non-engaging position so as to allow the internal gear to rotate, and when the control lever rotates, the retaining lever is put at the engaging position so as to prevent the internal gear from rotation by engagement between the ratchet teeth and the retaining lever. When the internal gear can rotate, the power transmission route is established to be in a disconnected state, and when the internal gear is prevented from rotation, the power transmission route is established to be in a connected state.

The fourth aspect is different from the third aspect only in that the sun gear and the reduction gear are connected to the spool side and the planetary gear side is connected to the motor side, so that operation thereof is the same as that of the third embodiment. Therefore, the operation and advantages similar to those of the third embodiment can be achieved.

As another preferred aspect (the fifth aspect) of the invention, the abovementioned ratchet mechanism comprises a ratchet gear having saw-blade teeth at the external circumference and directly connected to a rotational shaft of the seatbelt retractor or engaged with a gear directly connected to the rotational shaft, a pawl arranged to be engageable with the saw-blade teeth, a lever for driving the pawl so as to engage with and disengage from the saw-blade teeth, and a rotational body for driving the lever via a torque limiter, wherein the rotational body is driven by the motor.

As the fifth aspect, the motor is located at a normal position where the pawl is not engaged with saw-blade teeth of the ratchet gear. Upon receiving a collision predicting signal, the motor rotates, and a rotational body is rotated. The lever is driven so as to drive the pawl to a position engaging the saw-blade teeth of the ratchet gear. Therefore, the pawl and the ratchet gear form the ratchet mechanism, so that the ratchet gear can rotate in the seatbelt-retraction direction but it can not rotate in the withdrawing direction. Accordingly, the rotational shaft of the seatbelt retractor directly connected to the ratchet gear or connected thereto via a gear is also prevented from rotating in the withdrawing direction.

In this case, although the motor continues to rotate, because the torque limiter is arranged between the rotational body and the lever, a force for pushing the pawl by the ratchet gear is limited to a force determined by the torque limiter, so that the rotation of the ratchet gear in the direction retracting the seatbelt can not be prevented and the lever, etc. can not be damaged.

As the sixth aspect of the invention, the ratchet mechanism comprises a ratchet gear having saw-blade teeth at the external circumference that are directly connected to a rotational shaft of the seatbelt retractor or is engaged with a gear directly connected to a rotational shaft, a pawl which is arranged to be engageable with the saw-blade teeth and which rotates about a rotational pin arranged in a fixed part of the seatbelt retractor, and a driving mechanism for driving the pawl so as to engage with and disengage from the saw-blade teeth via an elastic body.

In the sixth aspect, a pawl driven by a driving device is located at a normal position such that the pawl is not engaged with the saw-blade teeth of the ratchet gear. Upon receiving a collision predicting signal, the driving device operates, and the lever is driven via an elastic body so as to rotate the pawl to a position engaging the saw-blade teeth of the ratchet gear. Therefore, the pawl and the ratchet gear form a ratchet mechanism, so that the ratchet gear can rotate in the direction retracting the seatbelt while can not rotate in the withdrawing direction. Accordingly, the rotational shaft of the seatbelt retractor directly connected to the ratchet gear or connected thereto via a gear is also prevented from rotating in the withdrawing direction.

In this case, because the elastic body is arranged between the driving device and the lever, a force of the ratchet gear for rotating in the direction retracting the seatbelt is absorbed by the elastic body so as not to prevent the rotation.

As another preferred aspect (the seventh aspect) of the invention, the abovementioned ratchet mechanism comprises a ratchet gear having saw-blade teeth at the external circumference that are directly connected to the rotational shaft of the seatbelt retractor or are engaged with a gear directly connected to the rotational shaft, a pawl that is arranged to be engageable with saw-blade teeth by rotation and has a pin fitted into a slotted hole formed on a fixed part of the seatbelt retractor, and a ratchet lever that is arranged to be connected to a reciprocation driving unit and has a rotational pivot of the pawl.

When the reciprocation driving unit is located at a first position, the pawl rotational pivot of the ratchet lever is located at a first position while the shaft of the pawl is located at one end of the slotted hole, so that the pawl is positioned apart from the ratchet gear. When the reciprocation driving unit is located at a second position, the pawl rotational pivot of the ratchet lever is located at a second position, so that the pawl is located at an engageable position with the ratchet gear. When the spool is rotated in the withdrawing direction at this state, the pawl rotates about the pawl rotational pivot so as to be stopped by abutment of the pin against the one end of the slotted hole, so that rotation of the ratchet gear is stopped. When the spool is rotated in the retracting direction, the pawl rotates about the pawl rotational pivot in the direction opposite to the aforementioned direction, so that the rotation of the ratchet gear is allowed by positioning of the pin at the other end of the slotted hole.

In the seventh embodiment, when the reciprocation driving unit is located at the first position, the pawl rotational pivot of the ratchet lever is located at the first position while the pin formed in the fixed part of the seatbelt retractor is located at one end of the slotted hole of the pawl. Therefore, the pawl is positioned apart from the ratchet gear, so that the ratchet gear can rotate freely and rotation of the spool is not prevented.

When the reciprocation driving unit is located at the second position, the pawl rotational pivot of the ratchet lever is located at the second position, so that the pawl is located at an engageable position with the ratchet gear. In this state, when the pin is located at the one end of the slotted hole, the pawl is engaged with the ratchet gear while when the pin is located at the other end of the slotted hole, the pawl is not engaged with the ratchet gear.

When the spool rotates in the withdrawing direction, the pawl rotates about the pawl rotational pivot so as to prevent the ratchet gear from rotation by abutting of the pin against the one end of the slotted hole. Therefore, rotation of the spool is prevented.

When the spool rotates in the retracting direction, the pawl is pushed by the ratchet gear so as to rotate about the pawl rotational pivot in the direction opposite to the aforementioned direction, so that the pin is positioned at the other end of the slotted hole. In this case, the pawl is not engaged with the ratchet gear and rotation of the ratchet gear is allowed.

As the eighth aspect of the invention, the seatbelt retractor in the seventh aspect further comprises an elastic body for urging the pawl in the rotational direction so as to bring the pawl into engagement with the ratchet gear.

In the eighth aspect, since the pawl is urged by the elastic body in the rotational direction so as to bring the pawl into engagement with the ratchet gear, when the reciprocation driving unit is located at the second position and the ratchet gear rotates in the withdrawing direction, the rotation can be prevented by secure engagement between the ratchet gear and the pawl.

DETAILED DESCRIPTION OF PREFERRED EMBODIMENTS

Figure 1:
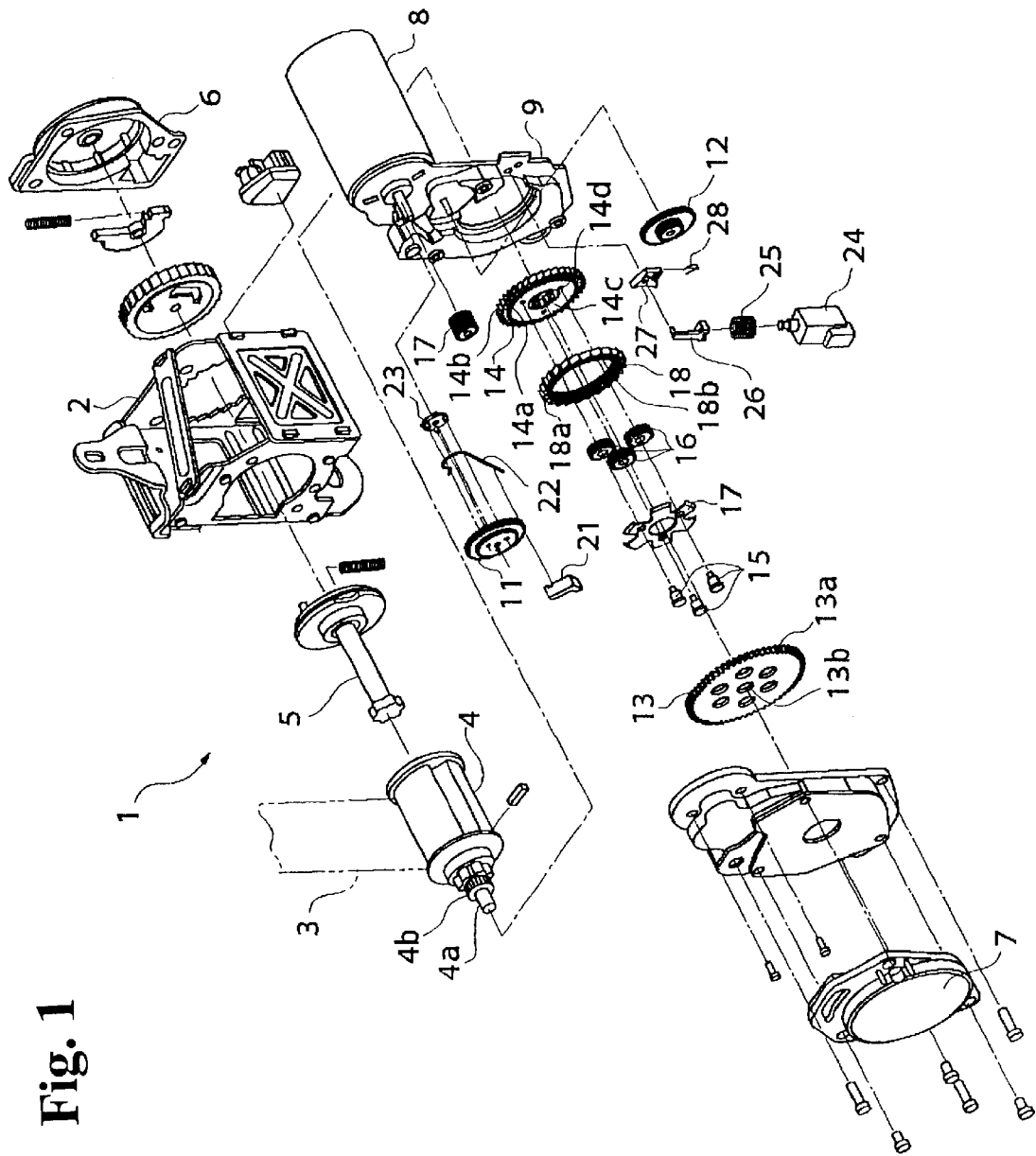
FIG. 1 is an exploded perspective view schematically illustrating a seatbelt retractor according to the first embodiment of the present invention.
Figure 16:
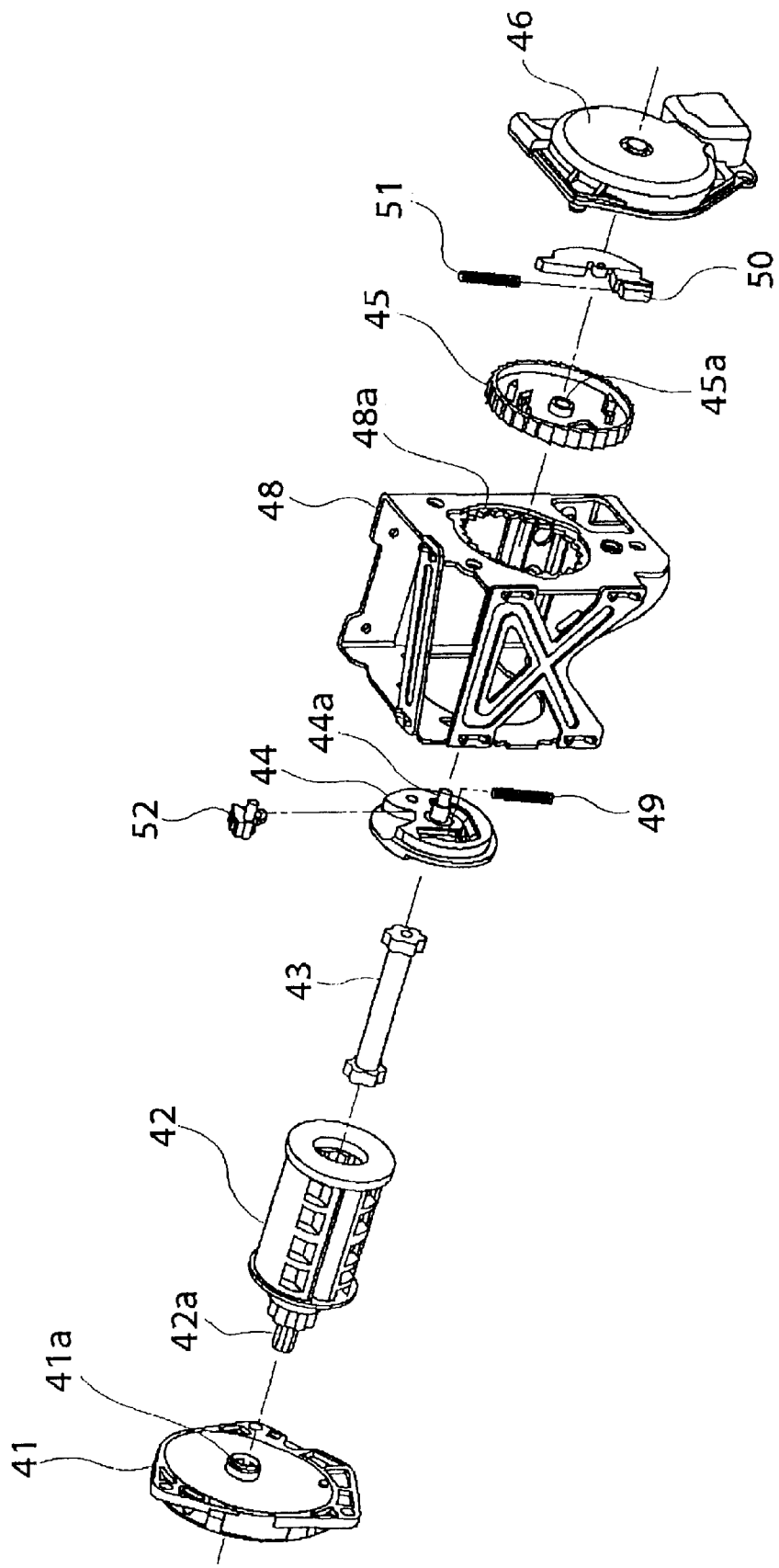
FIG. 16 is a schematic view of a conventional seatbelt retractor.

Examples of embodiments according to the present invention will be described below with reference to the drawings. FIG. 1 is an assembly view for showing an outline of a seatbelt retractor according to the embodiments of the present invention. In addition, in the embodiment shown in FIG. 1, the locking mechanism and so forth shown in FIG. 16 are also present. However, since they are irrelevant to the present invention, the description thereof is omitted.

As shown in FIG. 1, in a seatbelt retractor 1, a spool 4 for winding up a seatbelt 3 is accommodated within a frame 2. One end of a torsion bar 5 journaling the spool 4 is fitted into a retainer 6 and the other end thereof is fitted inside the spool 4. A spool shaft 4a is fitted into a bearing of a spring unit 7 in which a spring (not shown) for retracting a seatbelt is accommodated. The retainer 6 and the spring unit 7 are fixed at the frame 2. Therefore, the spool 4 is accommodated within the frame 2 so as to be held by the retainer 6 and the spring unit 7.

A motor 8 is fixed to a second retainer 9, and a motor gear 10 connected to a shaft of the motor 8 engages a connect gear 11 which in turn engages a reduction gear 13 via an intermediate reduction gear 12. The reduction gear 13 has large-diameter teeth 13a meshing with the intermediate reduction gear 12 at the external periphery and a sun gear 13b in the center as well.

Figure 2:
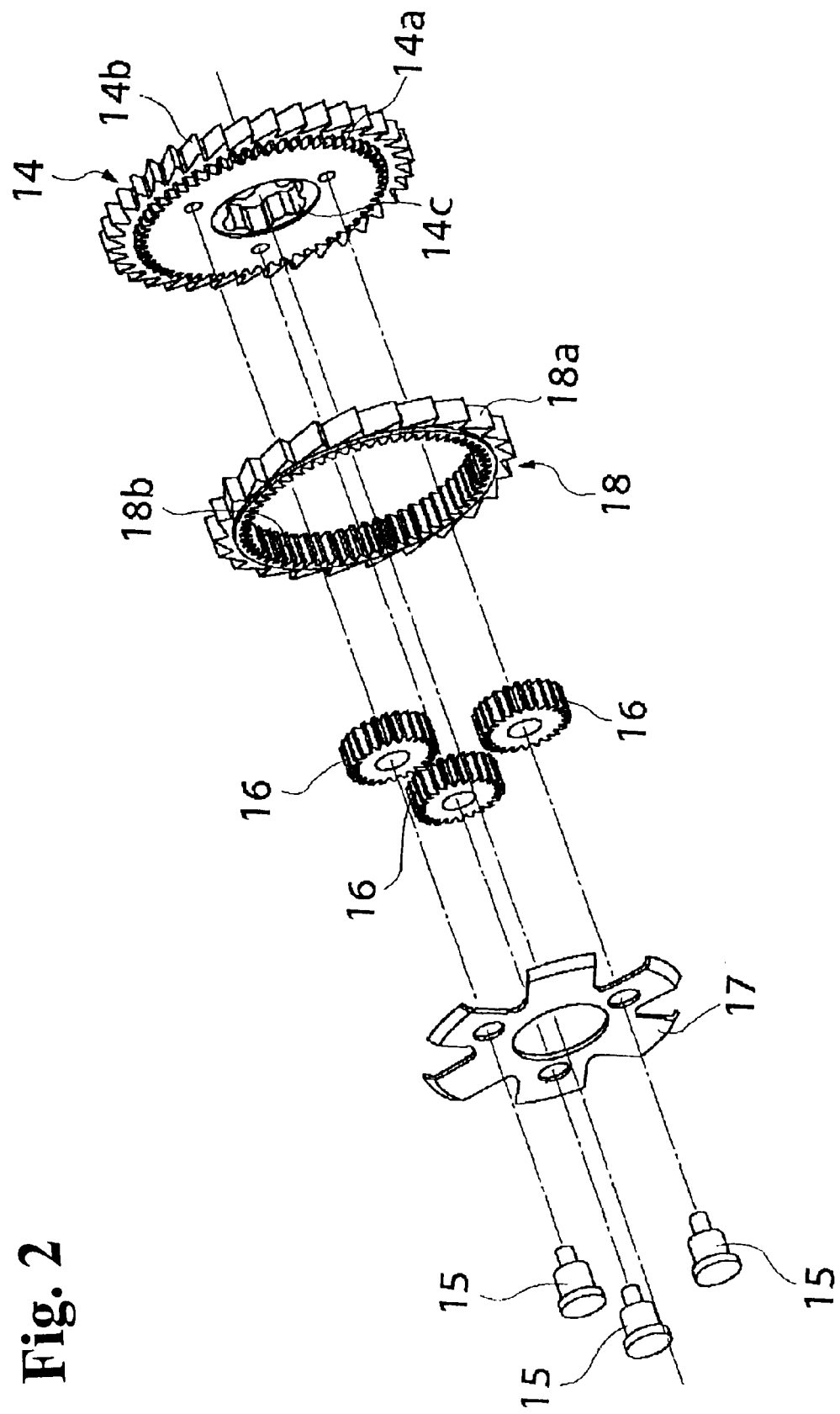
FIG. 2 is a schematic view of an essential part of a switching mechanism of a power transmission route according to the embodiment shown in FIG. 1.

A carrier gear 14 whose center hole (spline hole) 14c is fitted with a spline shaft 4b of the spool 4 rotates integrally with the spool 4. As shown in FIG. 2 in detail, ratchet teeth 14b are formed at the external periphery of the carrier gear 14. The carrier gear 14 is provided with three screw holes 14d into which screws formed at the ends of reduction pins 15 are screwed. Each one of planetary gears 16 is rotatably journaled by the respective reduction pins 15 and held by a reduction plate 17.

A ring-shaped internal gear 18 has ratchet teeth 18a at the external circumference and internal teeth 18b on the internal circumference. The internal teeth 18b engage the planetary gears 16. That planetary gears 16 are sandwiched between the sun gear 13b and the internal teeth 18b of the internal gear 18, and the planetary gears 16 can rotate on their own axes about the reduction pins 15 while being capable of revolving around the central axis of the carrier gear 14 (axial center of the spool 4).

In the seatbelt retractor constructed as above, as a mechanism for switching a power-transmitting route between the spool 4 and the motor 8, there are provided a retaining lever 21, a lever spring 22 for holding the retaining lever 21 and being rotatable integrally with a connect gear 11, and a spring-holding member 23.

Figure 3:
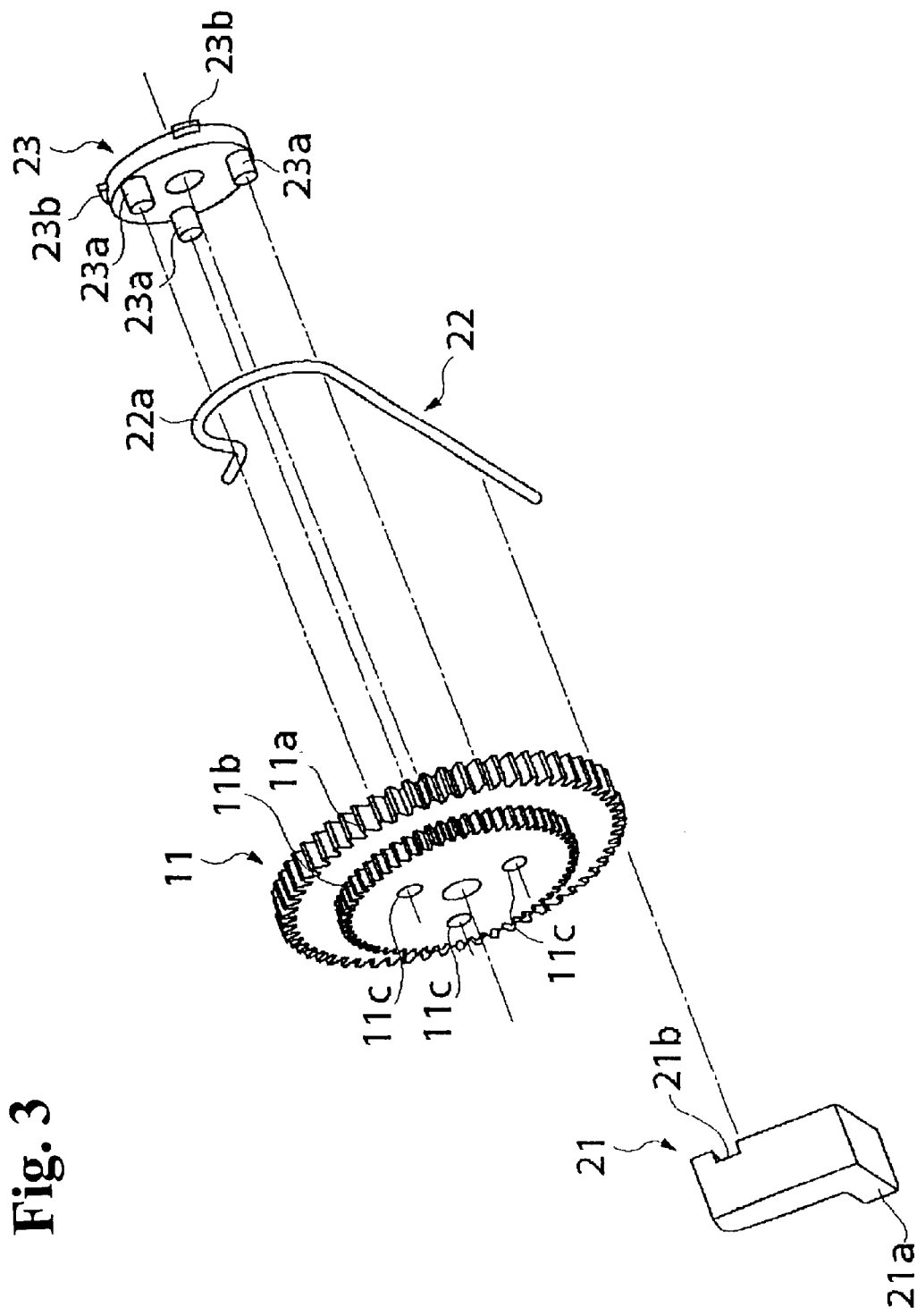
FIG. 3 is a schematic view of an essential part of the switching mechanism of the power transmission route according to the embodiment shown in FIG. 1.

This mechanism is illustrated in FIG. 3 in detail. A side face in the axial direction of the spring-holding member 23 is provided with three projected pins 23a extending in the axial direction. The spring-holding member 23 is assembled to the connect gear 11 by fitting these projected pins 23a into three holes 11c extending in the axial direction of the connect gear 11, respectively. On the external circumference face of the spring-holding member 23, three projections 23b extending in the radial direction are also arranged at equal intervals in the circumferential direction. While the lever spring 22 is arranged so as to locate a curved portion 22a thereof on the external circumference of the spring-holding member 23, the curved portion 22a is clamped between two projections 23b of the spring-holding member 23 and the connect gear 11 while having a predetermined friction in the rotational direction, so that the lever spring 22 is assembled to the spring-holding member 23.

The retaining lever 21 moves parallel along a groove formed in the second retainer 9 and is arranged so as to be able to contact with and separate from the ratchet teeth 18a of the internal gear 18 by the parallel displacement. The retaining lever 21 is driven by the lever spring 22 fitted into a recess 21b thereof so as to move parallel as mentioned above.

Figure 4:
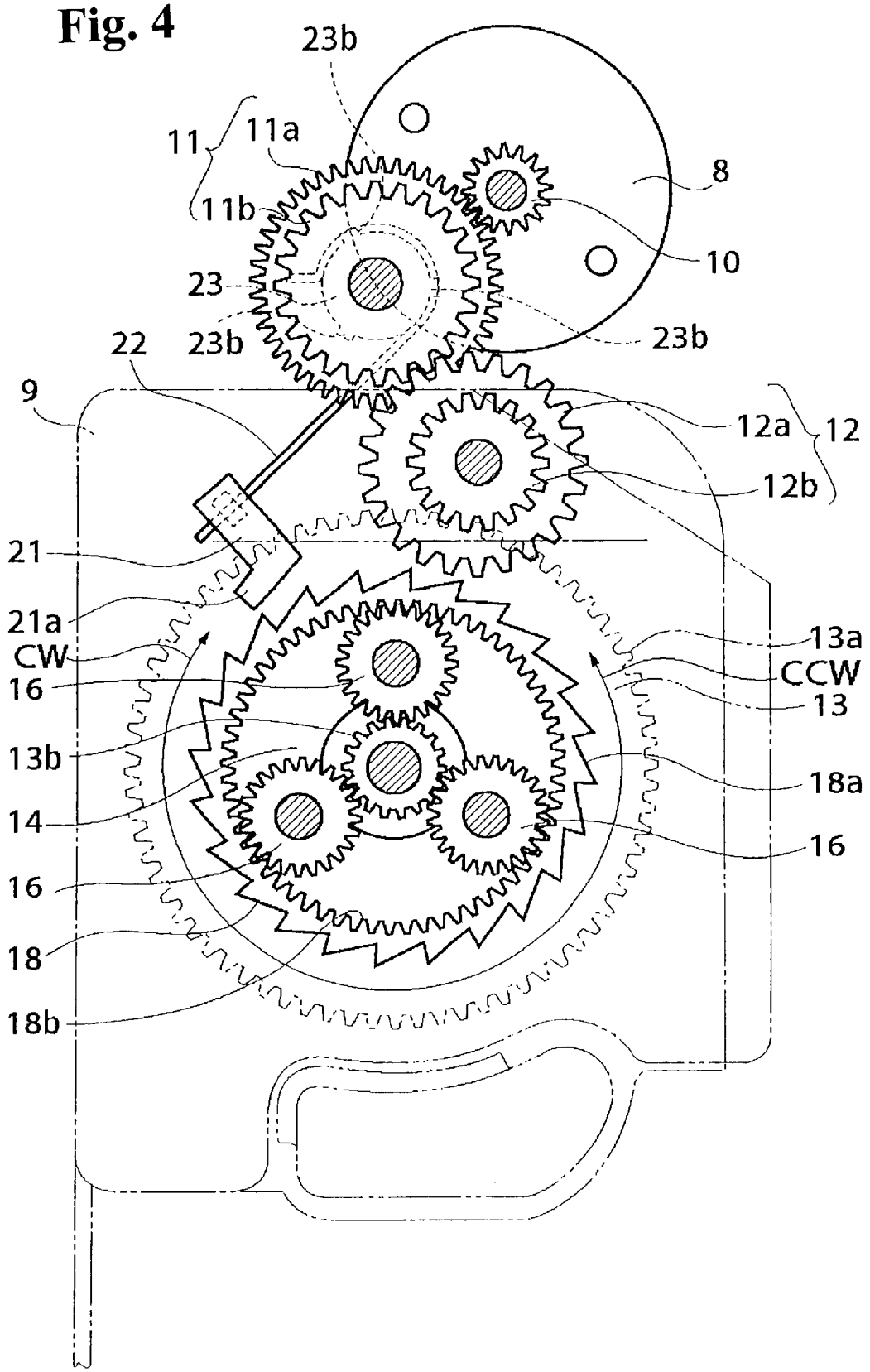
FIG. 4 is a schematic view for showing an operation of the switching mechanism of the power transmission route according to the embodiment shown in FIG. 1.

The power transmitting mechanism between the motor 8 and the spool 4 and the switching mechanism of the power transmission will be described below with reference to FIGS. 4 through 6.

As shown in these drawings, the rotation of the motor 8 is transmitted from the motor gear 10 to the connect gear 11 via teeth 11a of the connect gear 11, and is further transmitted to the intermediate reduction gear 12 via teeth 12a of the intermediate reduction gear 12. The rotation of the motor 8 is furthermore transmitted to the reduction gear 13 via the teeth 12a of the intermediate reduction gear 12 and the large-diameter teeth 13a of the reduction gear 13. The reduction gear 13 is provided with the sun gear 13b integrally attached thereto coaxially. Therefore, when the motor 8 rotates, the gear group is integrally rotated.

On the other hand, the center hole (spline hole) 14c of the carrier gear 14 is fitted with the spline shaft 4b of the spool 4 shown in FIG. 1, as mentioned above. Therefore, when the spool 4 rotates, the carrier gear 14 is integrally rotated, and three planetary gears 16 are revolved around the spool shaft.

The internal gear 18 switches the connection between the power transmission system connected to the motor 8 and the power transmission system connected to the spool 4. FIG. 4 represents a state that the motor 8 does not rotate. In this state, the retaining lever 21 is in a position where the retaining lever 21 does not engage the ratchet gear 18a of the internal gear 18 by means of the urging force of the lever spring 22. Therefore, the internal gear 18 is in a completely free state and can rotate without any resistance. In contrast, in order to rotate the sun gear 13b and the reduction gear 13, the rotational resistance of the motor 8 has to be overcome.

When the spool 4 rotates in either direction, the planetary gear 16 revolves. Because the internal gear 18 has no resistance at this time, the planetary gear 16 revolves around the sun gear 13a while rotating on its own shaft so as to rotate the internal gear 18. That is, the sun gear 13a does not rotate. Therefore, the spool 4 can rotate without the rotational resistance of the motor 8. Accordingly, specifically when an occupant pulls out the seatbelt, the occupant can pull out without a significant resistance (only a force of the spring for retraction).

Figure 5:
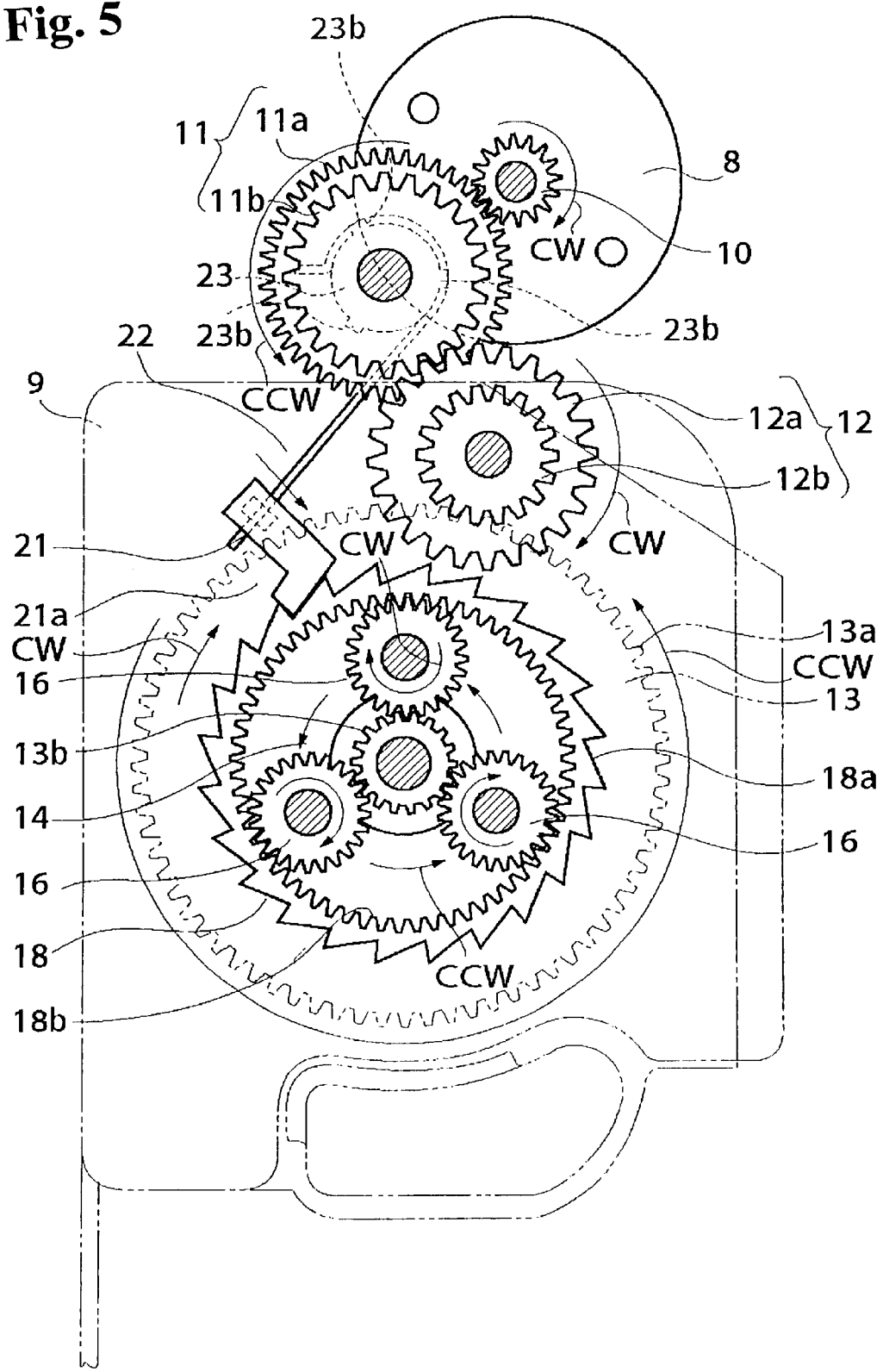
FIG. 5 is a schematic view of an operation of the switching mechanism of the power transmission route according to the embodiment shown in FIG. 1.

FIG. 5 is a drawing showing a state that the motor 8 is driven in the direction retracting the seatbelt. When the motor 8 rotates in the CW direction in the drawing, the connect gear 11 rotates in the CCW direction with a reduced speed. Then, the lever spring 22 also rotates together in the same direction accompanied by the rotation of the connect gear 11 in the direction CCW because the curved portion 22a of the lever spring 22 is held through certain frictional force between the projections 23b of the spring-holding member 23 and the connect gear 11 in the rotational direction, as described above.

Therefore, the retaining lever 21 moves in parallel toward the internal gear 18 so as to reach a position in which a retaining claw 21a contacts the external circumference of a ratchet tooth 18a of the internal gear 18 to be engageable therewith. After the retaining claw 21a contacts the external circumference of the ratchet tooth 18a, the lever spring 22 can not rotate furthermore in the CCW direction. However, slippage between the connect gear 11 and the lever spring 22 enables the connect gear 11 to rotate relative to the lever spring 22, enabling the motor 8 to continue the rotation.

Simultaneously, the rotation of the connect gear 11 that is reduced in the speed via the intermediate reduction gear 12 is transmitted to the reduction gear 13 which in turn rotates in the direction of a belt CCW, so that the sun gear 13b rotates at the same speed and direction as those of the reduction gear 13. The rotation of the sun gear 13b causes each planetary gear 16 to rotate on its axis in the CW direction and the internal gear 18 to rotate in the CW direction. At this time, each planetary gear 16 does not revolve because the internal gear 18 rotates.

When the internal gear 18 rotates in the CW direction, the ratchet tooth 18a and the retaining claw 21a are engaged each other so as to stop rotation of the internal gear 18.

When the internal gear 18 stops to rotate, because each planetary gear 16 rotates on its axis due to the driving torque of the motor 8 as mentioned above, each planetary gear 16 is reduced in the speed and revolves around the sun gear 13b in the CCW direction along the internal teeth 18b of the internal gear 18.

Accordingly, the carrier gear 14 holding the planetary gears 16 rotates at the same speed as the revolving speed of each planetary gear 16 in the CCW direction, so that the spool 4 rotates in the direction retracting the seatbelt.

Figure 6:
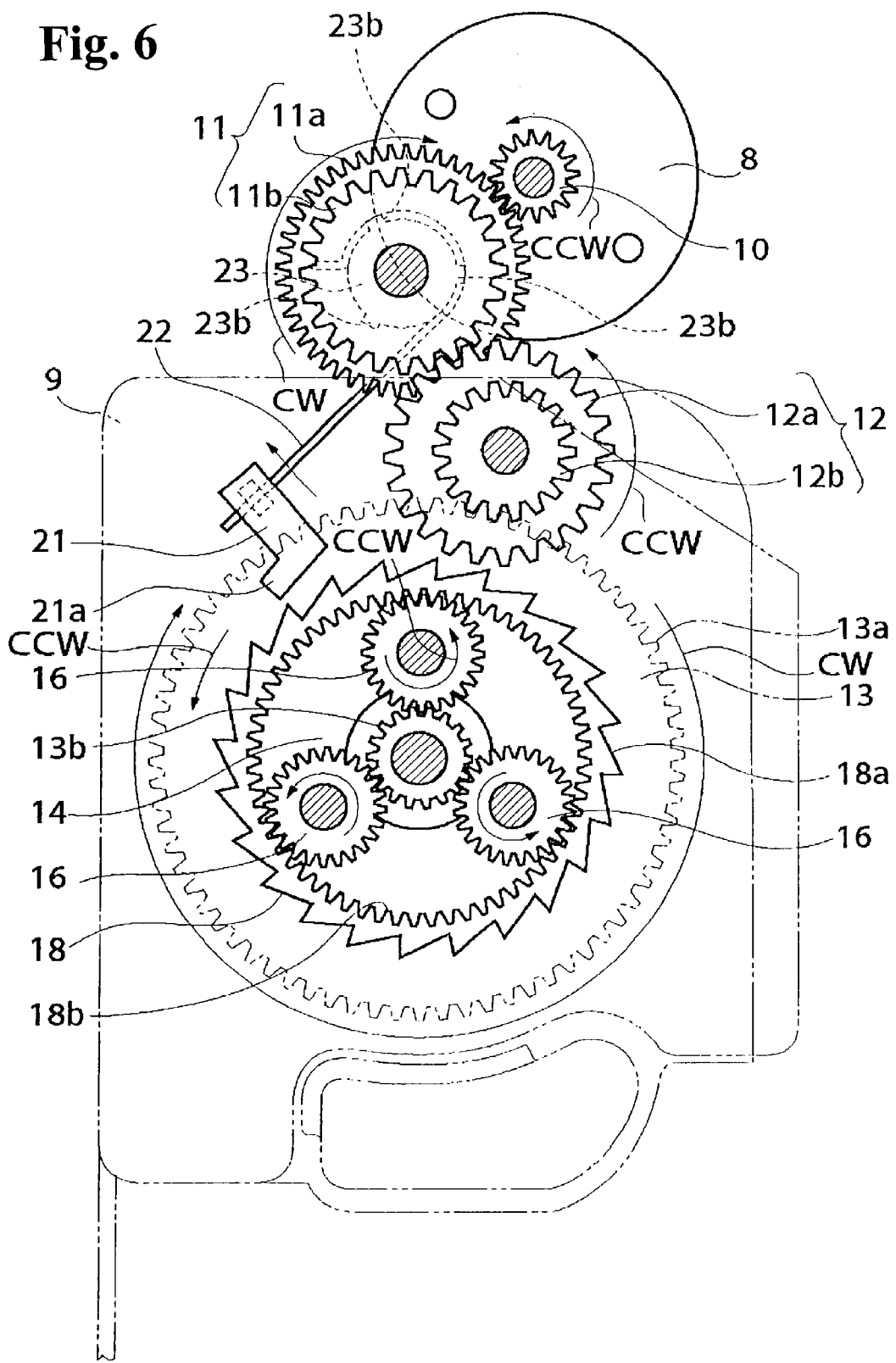
FIG. 6 is a schematic view of an operation of the switching mechanism of the power transmission route according to the embodiment shown in FIG. 1.

FIG. 6 is a drawing showing a state that the motor 8 rotates in the direction withdrawing the seatbelt. When the motor 8 rotates in the CCW direction in the drawing, the connect gear 11 is reduced in the speed and rotates in the CW direction. Then, because the curved portion 22a of the lever spring 22 is held through friction force between the projections 23b of the spring-holding member 23 and the connect gear 11 in the rotational direction, the lever spring 22 also rotates together in the same direction accompanied by the rotation of the connect gear 11 in the CW direction. Therefore, the retaining lever 21 moves in parallel in the direction away from the internal gear 18 so as to bring out of engagement between the retaining claw 21a and the ratchet teeth 18a of the internal gear 18. Then, the internal gear 18 can rotate freely.

In the same manner as that shown in FIG. 5, the reduction gear 13 and the sun gear 13a are driven by rotation of the motor 8, so that the rotation of the sun gear 13a is transmitted to the planetary gears 16 so as to rotate the planetary gears 16 on their axes. However, because the internal gear 18 rotates without any rotational resistance, the planetary gears 16 do not revolve, and therefore, the rotation of the motor 8 is not transmitted to the spool 4.

In summary of the description above, when the motor rotates in the retracting direction, rotation of the internal gear is stopped by the retaining lever driven by the rotational force of the motor, so that a power transmission route between the motor and the spool is connected. In other cases, the retaining lever is not engaged with the internal gear, so that the internal gear can rotate freely, and the power transmission route between the motor and the spool is disconnected.

In the embodiment described above, the retaining lever is driven by the power of the motor. However, it may be electrically driven by a solenoid, for example, so as to engage with and disengage from the internal gear.

In the following sections, a mechanism that locks the rotation of the spool 4 in the direction withdrawing the seatbelt and allows the rotation in the direction retracting the seatbelt will be described. The mechanism is formed of the ratchet teeth 14b of a carrier gear 14, a solenoid 24, a plunger spring 25, a ratchet lever 26, a pawl 27, and a ratchet spring 28, which are shown in FIG. 1. Operation of the mechanism will be described with reference to FIGS. 7 though 11.

Figure 7:
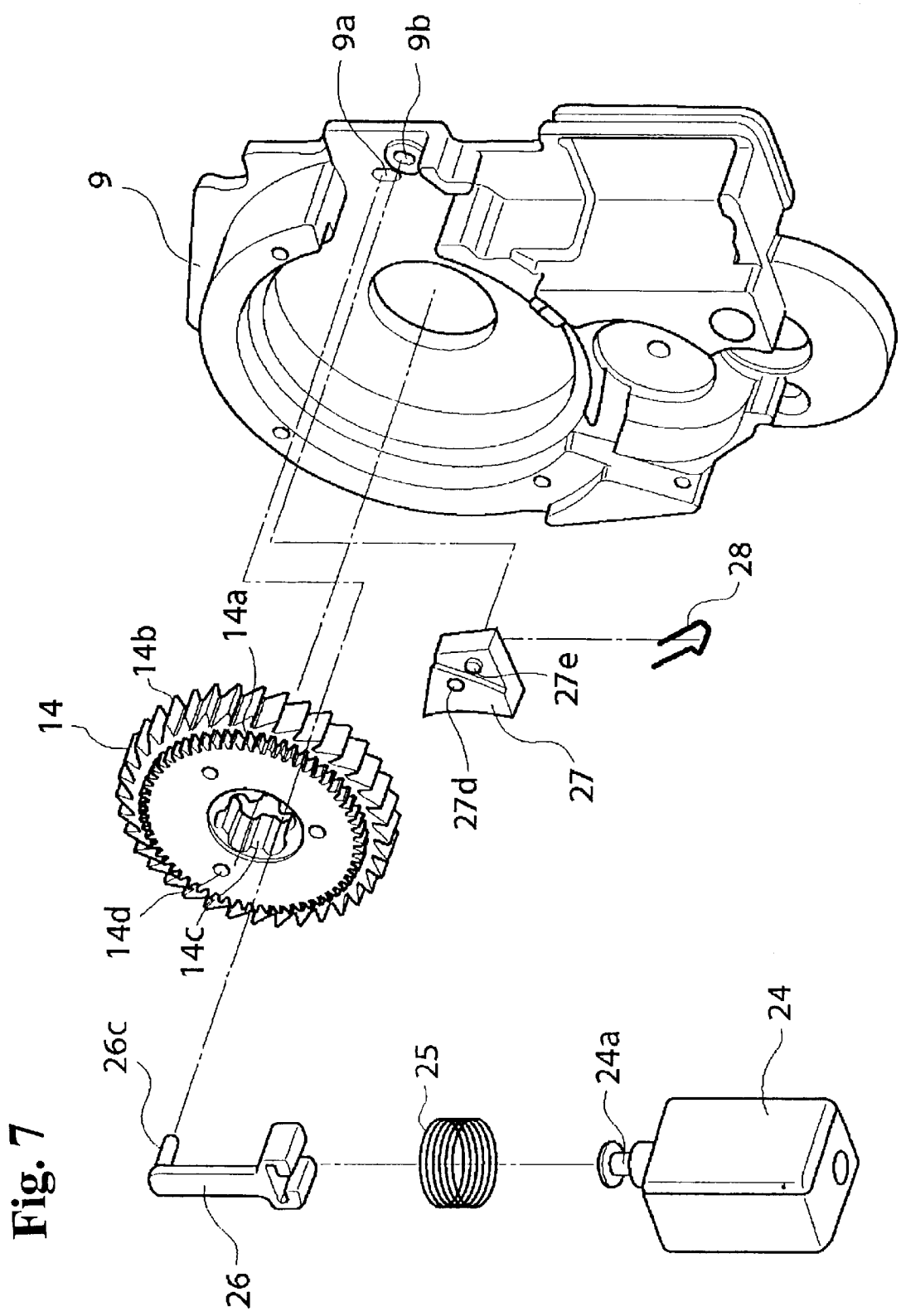
FIG. 7 is an assembly view illustrating an essential part of a locking mechanism (ratchet mechanism) according to the embodiment shown in FIG. 1.

FIG. 7 is an exploded perspective view showing an essential part of the locking mechanism (ratchet mechanism). A piston 24a of the solenoid 24 engages the ratchet lever 26 that is upwardly raised as viewed in the drawing by extension of the piston 24a due to a function of the plunger spring 25 when the solenoid 24 is not exited. A projection 26c formed in the ratchet lever 26 passes through a hole 27d of the pawl 27 so as to fit into a slotted hole 9a of the second retainer 9.

As shown in FIGS. 8 through 11, one end of the ratchet spring 28 is fixed to the second retainer 9 and the other end contacts a projection 27e of the pawl 27 so as to urge the pawl 27 by the elastic force of the ratchet spring 28 in the direction meshing with the ratchet teeth 14b of the carrier gear 14 using the projection 26c of the ratchet lever 26 as a rotational shaft. In addition, although not shown in the drawings, the projection 27e is also arranged in the backside of the pawl 27 at the same position so as to fit into a slotted hole 9b of the second retainer 9. The shape of the second retainer 9 shown in FIG. 7 is slightly different from that shown in FIG. 1, but it is irrelevant to the description of the present invention, so that the both are not dare to be coordinated with each other.

Operation of the locking mechanism having such a structure will be described below with reference to FIGS. 8 through 11.

Figure 8A:
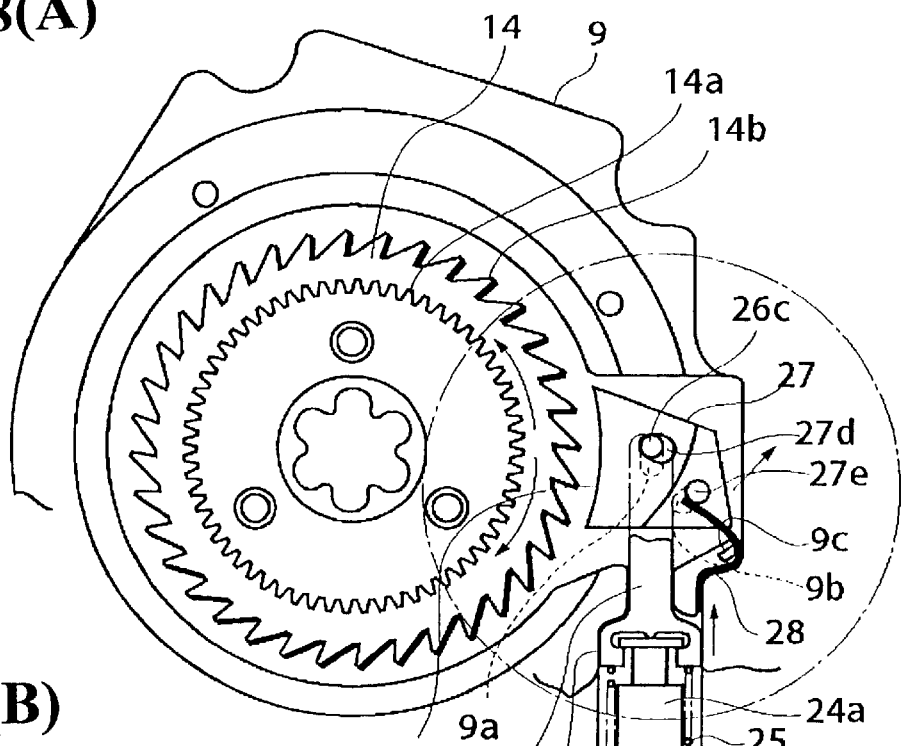
FIGS. 8(A) and 8(B) are schematic views of the operation of the locking mechanism shown in FIG. 7.
Figure 8B:
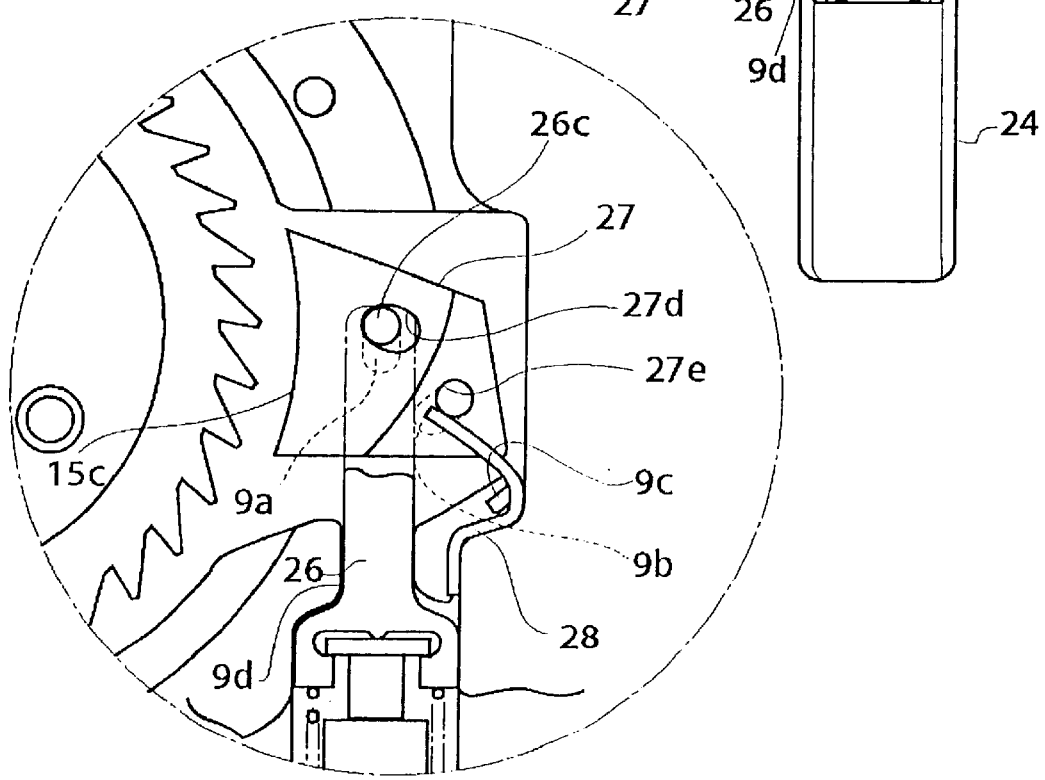

FIG. 8(A) shows a steady state in which the solenoid 24 is not excited. At this time, the piston 24a is extended by the urging force of the plunger spring 25, and the ratchet lever 26 is located at the upper end of a guide part 9c. The projection 26c abuts against the upper end of the slotted hole 9a. The ratchet spring 28, which is fixed to the second retainer 9 at one end, abuts against the projection 27e of the pawl 27 via a pin formed in the second retainer 9 so as to rotate the pawl 27 counterclockwise using the projection 26c as a rotational shaft. Therefore, in a state that the projection 27e on the backside of the pawl 27 abuts against the upper right end of the slotted hole 9b of the second retainer 9, the pawl 27 stops to rotate so as to be positioned at that position.

However, an engagement part 27c of the pawl 27 is apart from the ratchet teeth 14b of the carrier gear 14 in this state, so that the spool 4 is not prevented from rotating because the carrier gear 14 can rotate freely.

Figure 9:
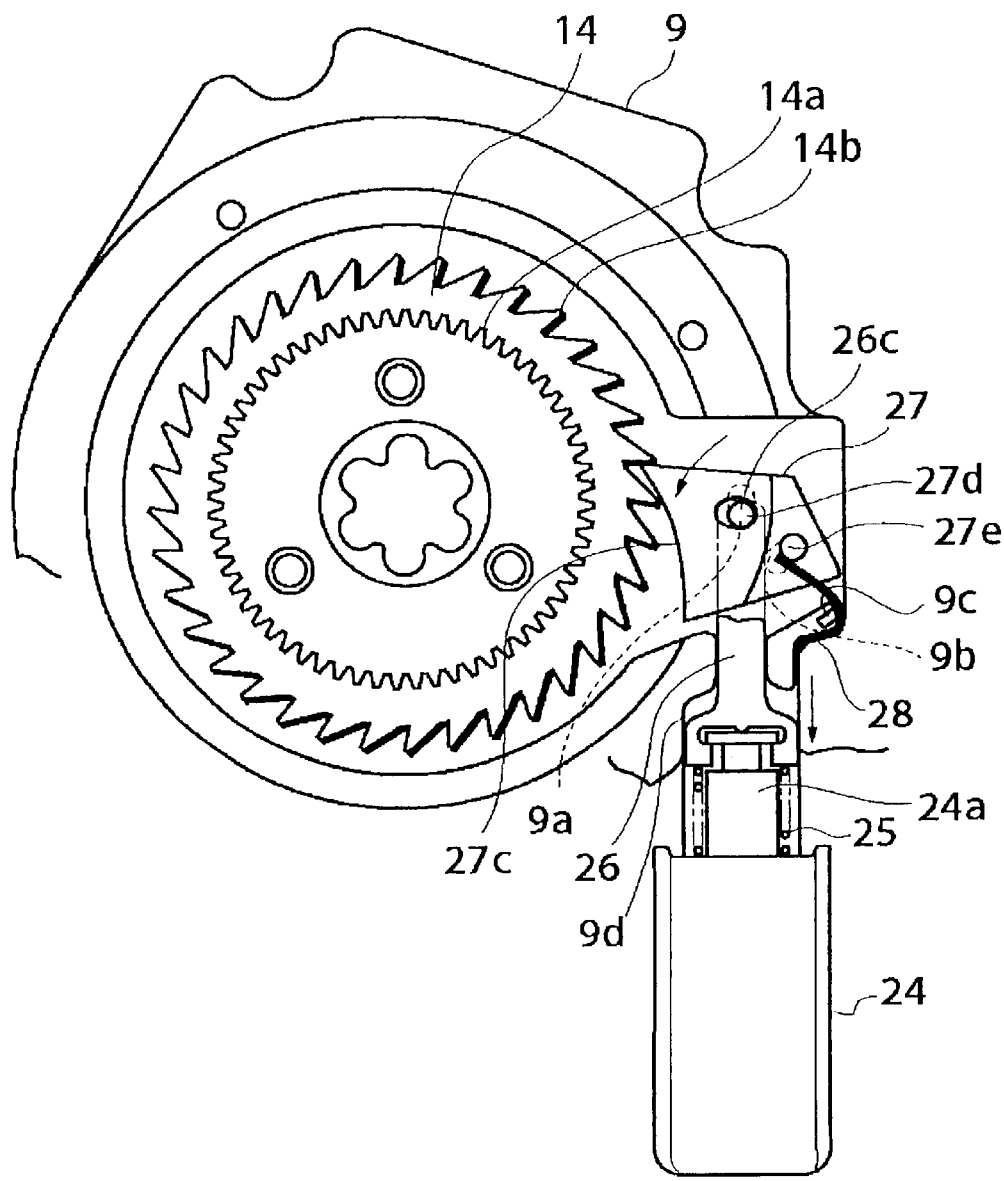
FIG. 9 is a schematic view of the operation of the locking mechanism shown in FIG. 7.

FIG. 9 shows the change from the state shown in FIG. 8(A) to a state in which the solenoid 24 is excited. At this time, the piston 24a is retracted against the urging force of the plunger spring 25, and therefore, the ratchet lever 26 is lowered along the guide part 9c. Then, the projection 26c is brought into contact with the lower end of the slotted hole 9a so as to stop at the position. At this time, because the projection 26c passes through the hole 27d, the position of the pawl 27 is lowered. The pawl 27 is counterclockwise rotated further from the position shown in FIG. 8(A) about the projection 27e abutting against the upper right end of the slotted hole 9b due to the urging force of the ratchet spring 28. Accordingly, the end of the engagement part 27c is moved to a position meshing with the ratchet teeth 14b of the carrier gear 14, as shown in FIG. 9.

Figure 10:
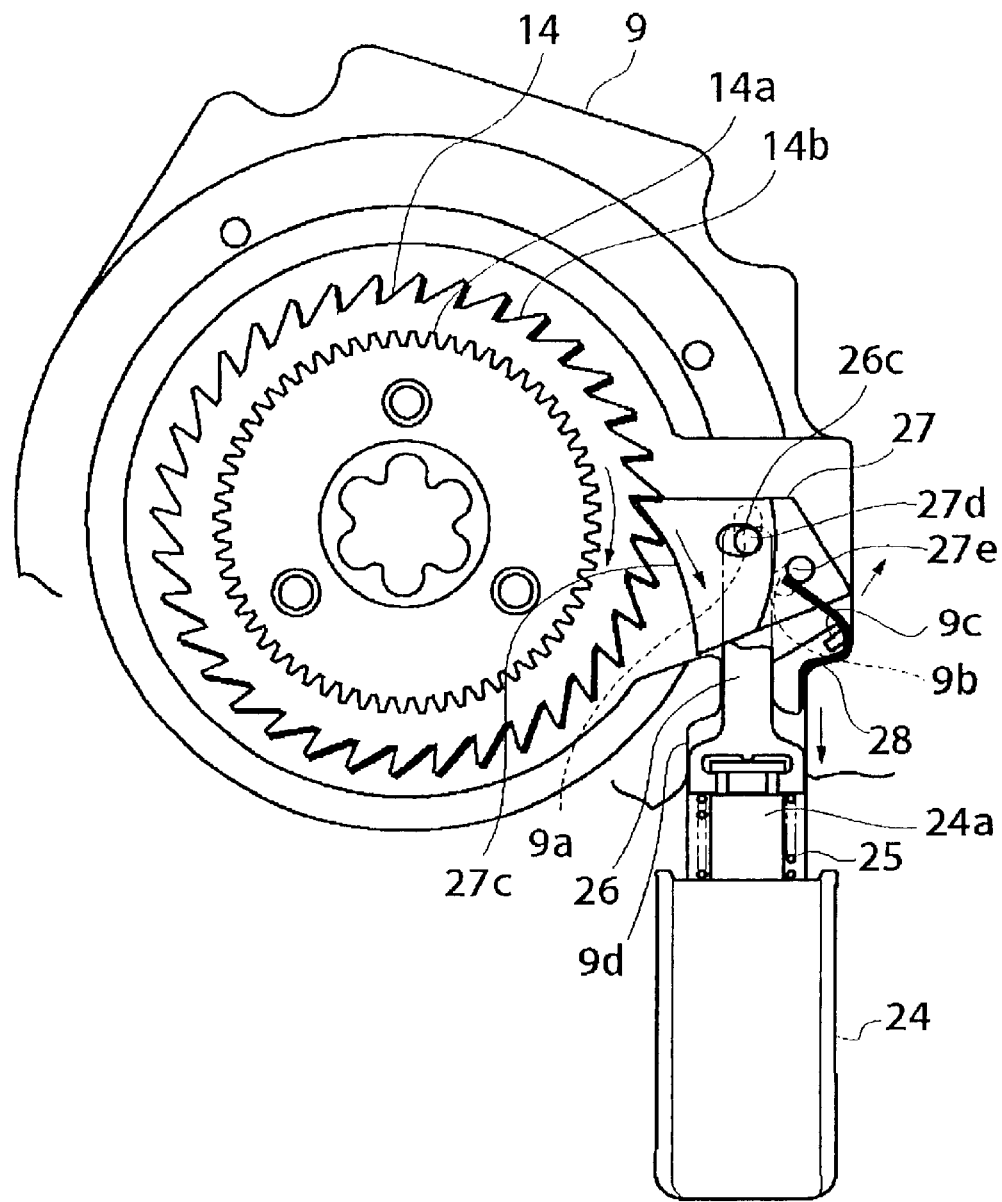
FIG. 10 is a schematic view of the operation of the locking mechanism shown in FIG. 7.

FIG. 10 shows a state when the spool rotates in the direction withdrawing the seatbelt in the state shown in FIG. 9. At this time, the carrier gear 14 rotates clockwise as shown in the drawing. Then, the ratchet teeth are brought into engagement with the engagement part 27c of the pawl 27. Thus, the pawl 27 is to rotate counterclockwise as indicated by an arrow in the drawing using the projection 26c as the center. However, it can not rotate because the projection 27e is restricted by the end of the slotted hole 9b, therefore stopping the rotation of the carrier gear 14. Accordingly, the spool 4 can not rotate in the direction withdrawing the seatbelt.

Figure 11:
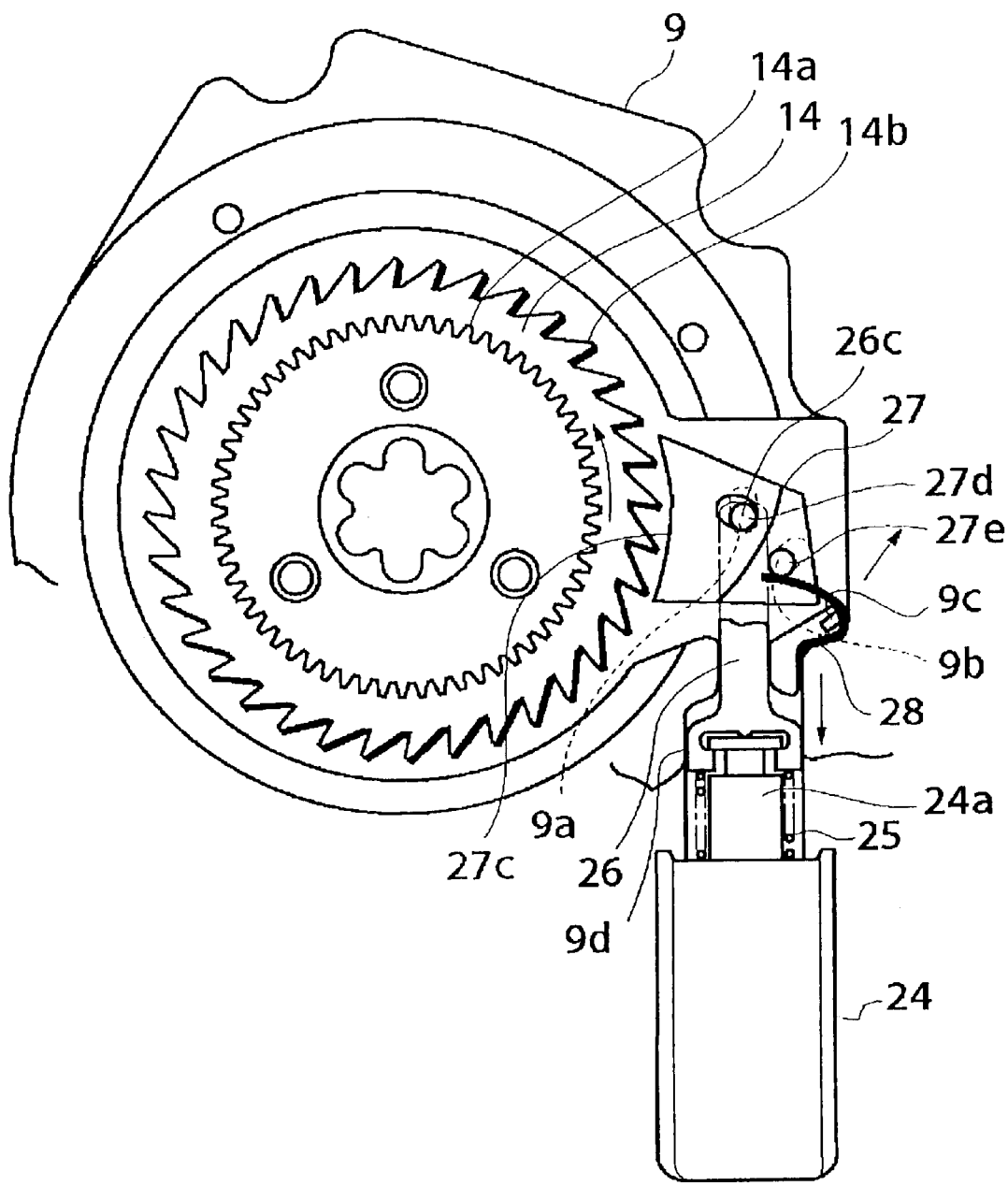
FIG. 11 is a schematic representation of operation of the locking mechanism shown in FIG. 7.

FIG. 11 shows a state when the spool rotates in the direction retracting the seatbelt in the state shown in FIG. 8(A). At this time, the carrier gear 14 rotates counterclockwise as shown in the drawing. Then, the engagement part 27c of the pawl 27 is pushed by the ratchet teeth 14b of the carrier gear 14 so as to rotate clockwise using the projection 26c as the center. This rotation is performed against the urging force of the ratchet spring 28. As a result, the projection 27e in the backside of the pawl 27 can move to the lower left end of the slotted hole 9b.

In such a manner, the pawl 27 allows the carrier gear 14 to rotate by riding over the gear in a state that the engagement part 27c thereof touches the teeth of the carrier gear 14 by the urging force of the ratchet spring 28. When the spool is to rotate in the withdrawing direction from the state shown in FIG. 11, since the engagement part 27c is in contact with the ratchet teeth 14b of the carrier gear 14, the rotation of the spool 4 is prevented by instantly turning to the state shown in FIG. 10.

As described above, when the solenoid 24 is not excited, the spool can rotate freely. When the solenoid 24 is excited, the spool can rotate in the direction retracting the seatbelt while can not rotate in the withdrawing direction.

Next, another mechanism that locks the rotation of the spool 4 in the direction withdrawing the seatbelt and allows the rotation in the direction retracting the seatbelt will be described. In any of the following drawings, the carrier gear 14 is used as a ratchet gear for allowing only the rotation in the direction retracting the seatbelt. The drawings are simplified to show as schematic illustrations.

Figure 12:
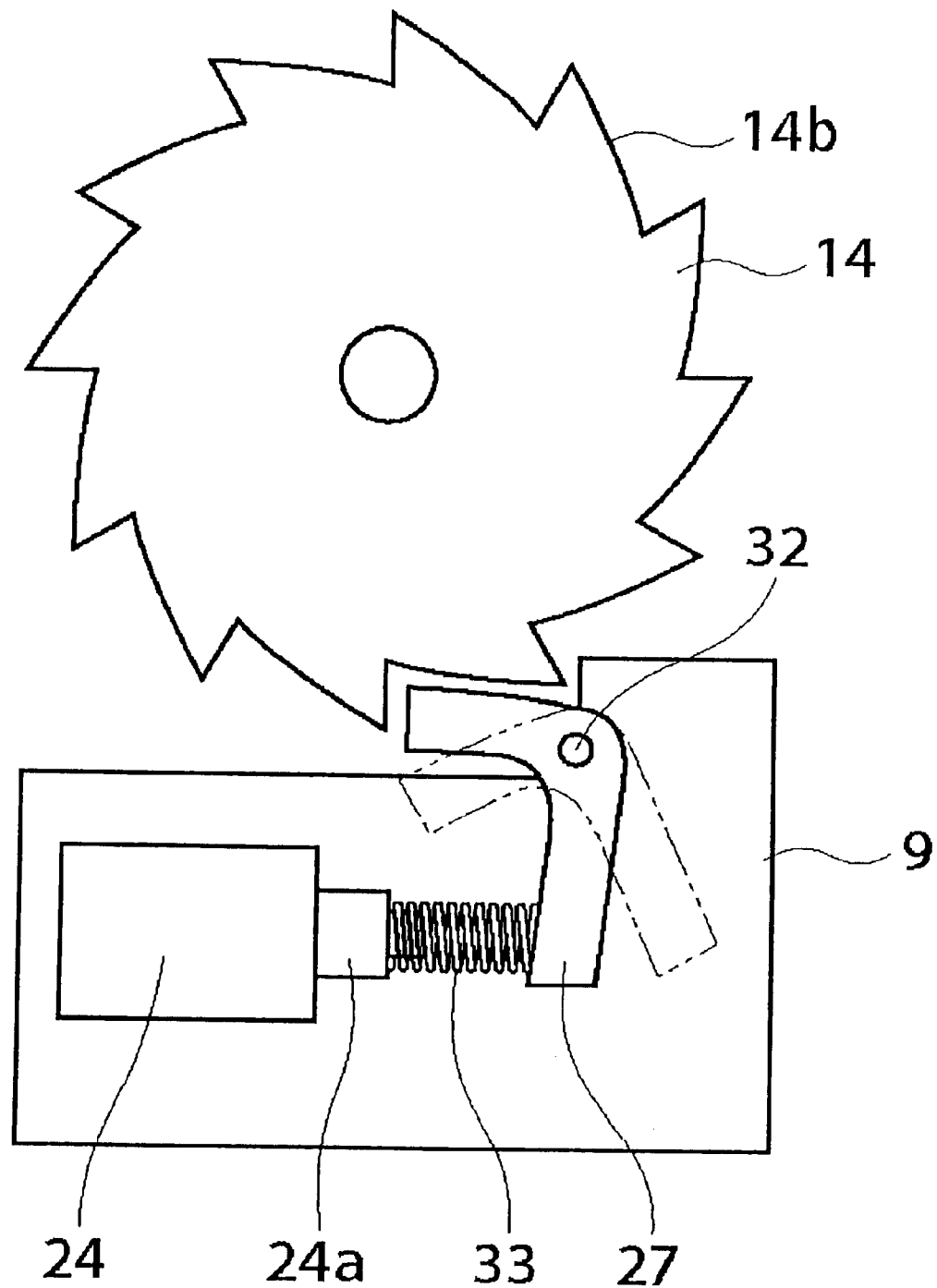
FIG. 12 is a drawing illustrating another structure of a locking mechanism (ratchet mechanism) of the invention.

FIG. 12 is a schematic view of a locking mechanism. In FIG. 12, the pawl 27 is held to rotate freely around a rotational pin 32 of the second retainer 9. The pawl 27 is bent-shaped as shown in the drawing. One end of the pawl 27 is to engage ratchet teeth 14a of the carrier gear 14 while the other end is connected to the piston 24a of the solenoid 24 via a spring member 33.

In a steady state, the piston 24a of the solenoid 24 is in an extended state, and the pawl 27 does not engage the ratchet teeth 14a of the carrier gear 14 as indicated by a phantom line. Therefore, the locking mechanism shown in FIG. 12 has not any effect on the operation of the seatbelt retractor.

When the solenoid 24 is actuated, the piston 24a is retracted. Therefore, via the spring member 33, the pawl 27 rotates clockwise about the rotational pin 32, so that one end of the pawl 27 moves to a position contacting the ratchet teeth 14a of the carrier gear 14, as indicated by a solid line in FIG. 12.

In this state, when a rotational force is applied in the direction withdrawing the seatbelt, the carrier gear 14 rotate counterclockwise. However, because a step portion of a saw-blade tooth of the carrier gear 14 comes to contact with the pawl 27 which is prevented from laterally moving by the rotational pin 32, the carrier gear 14 can not rotate.

On the other hand, the rotation in the direction retracting the seatbelt is allowed as a diagonal portion of the ratchet tooth 14a of the carrier gear 14 pushes the pawl 27 down, and the pawl 4 rotates counterclockwise about the rotational pin 32 so as to enable the rotation. That is, the ratchet teeth 14a of the carrier gear 14 and the pawl 27 form a ratchet. At this time, the force pushing the pawl 27 down is absorbed by the extension of the spring member 33.

Figure 13:
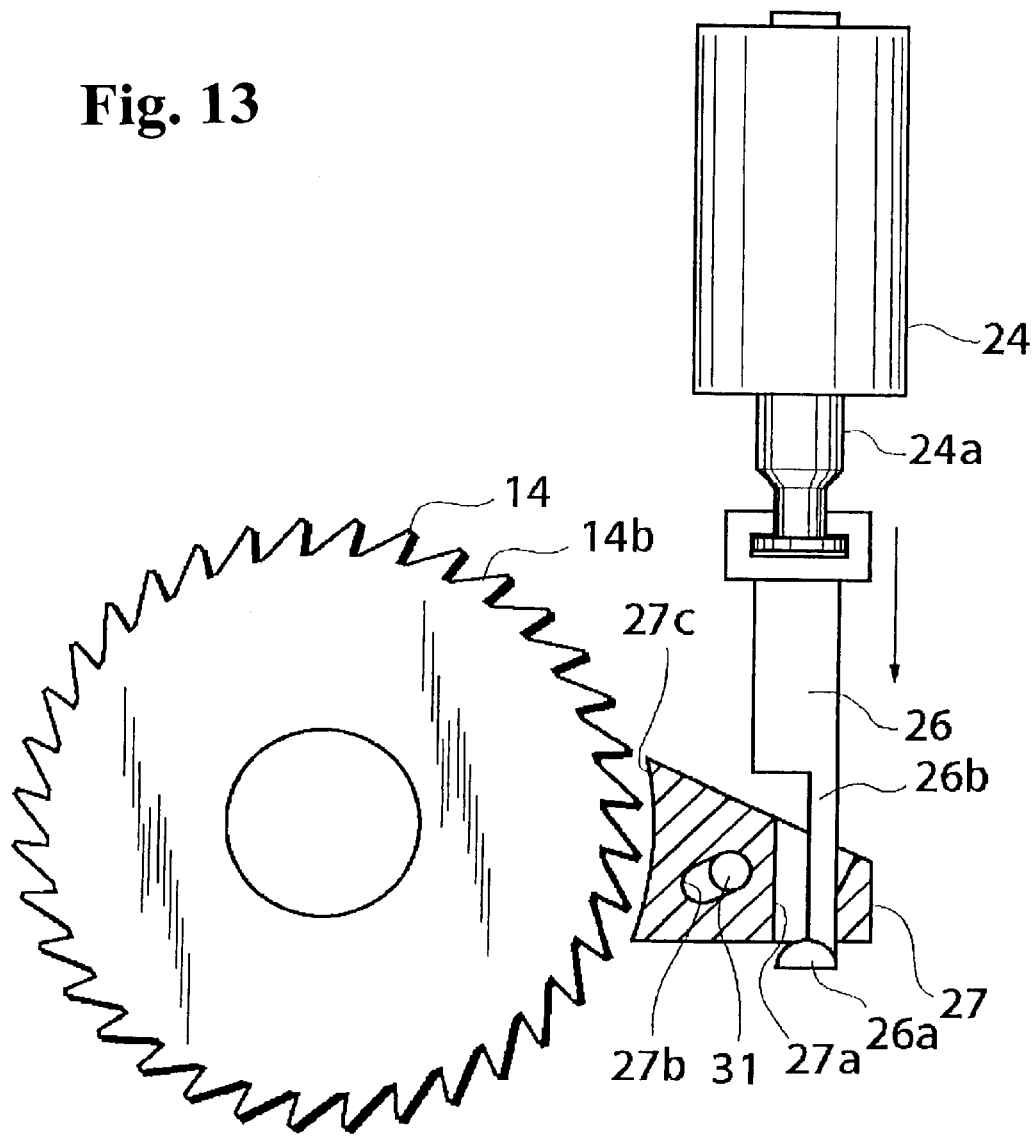
FIG. 13 is a drawing illustrating a further structure of a locking mechanism (ratchet mechanism) of the invention.
Figure 14:
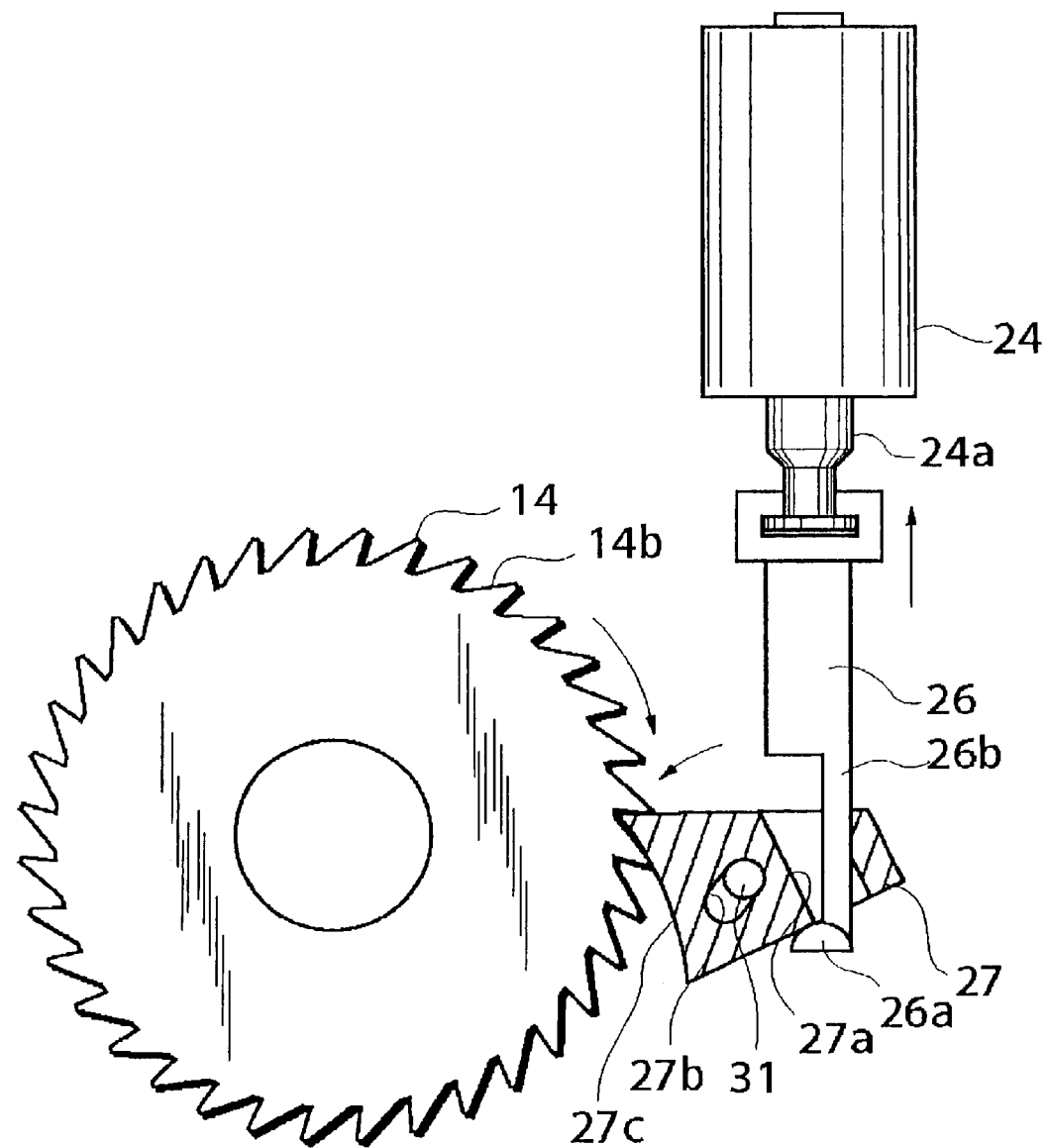
FIG. 14 is a schematic view of an operation of the locking mechanism shown in FIG. 13.
Figure 15:
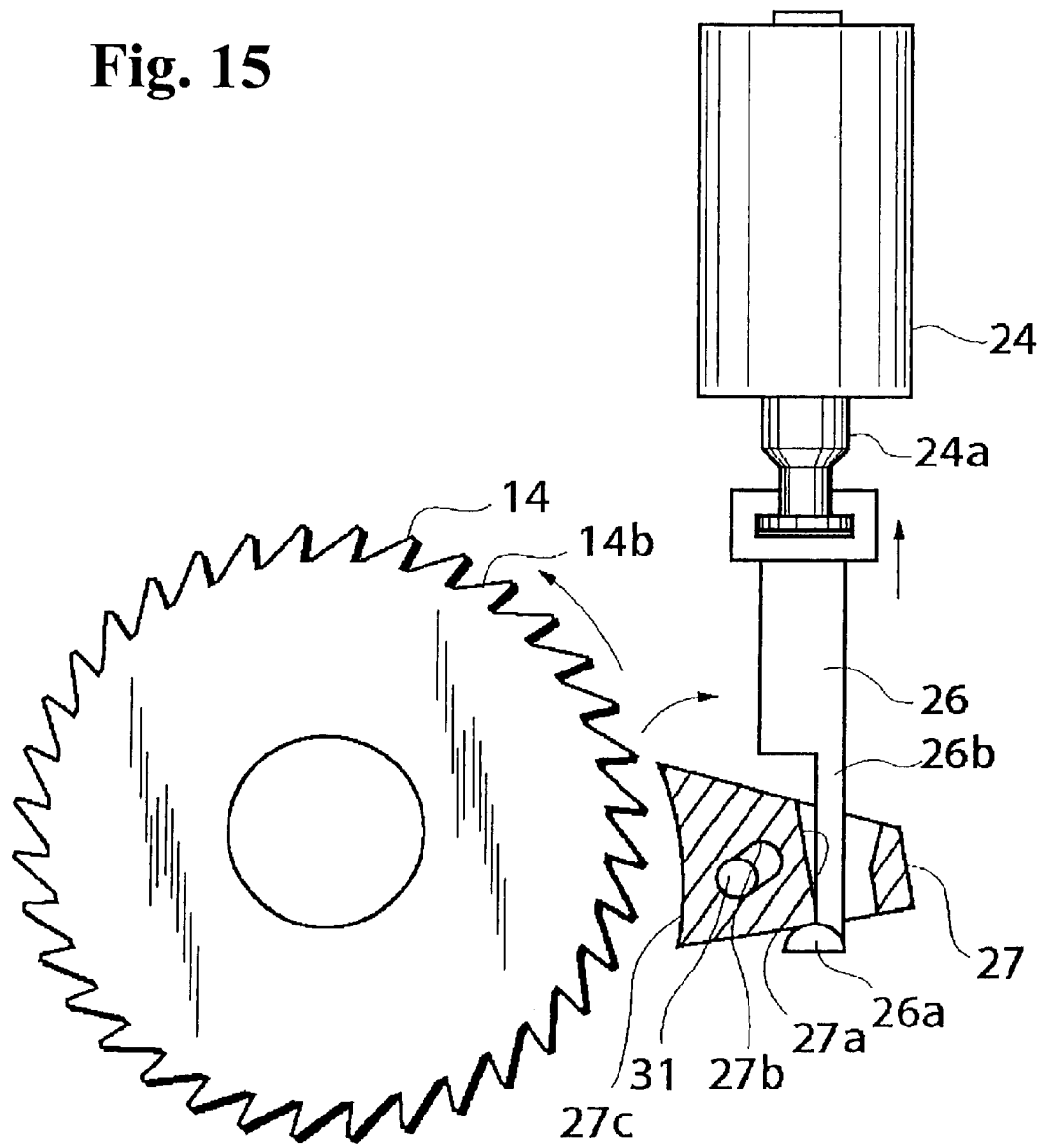
FIG. 15 is a schematic view of the operation of the locking mechanism shown in FIG. 13.

FIGS. 13 through 15 are schematic views showing another locking mechanism of the present invention. FIG. 13 is a drawing showing a steady state in which the piston 24a of the solenoid 24 is extended. Therefore, the ratchet lever 26 is in a downwardly lowered state, and therefore, the pawl 27 supported by a rotating shaft part 26a is lowered down due to gravity, so that an upper right portion of a slotted hole 27b abuts against a supporting shaft 31 arranged in a fixed part (a retainer, for example). As a result, the pawl 27 is supported by the supporting shaft 31 and the rotating shaft part 26a of the ratchet lever 26 to stop at the position shown in the drawing.

In this state, the engagement part 27c of the pawl 27 is away from the ratchet teeth 14a of the carrier gear 14 that can rotate freely. A thin part 26b of the ratchet lever 26 comes to contact with the right end of a guide hole 27a of the pawl 27. The guide hole 27a is larger in its diameter than the thin part 26b as shown in the drawing and especially in the upper part, it is enlarged at the upper right thereof. Therefore, the pawl 27 can move laterally to some extent, while can rotate about the rotating shaft part 26a.

When the piston 24a of the solenoid 24 is retracted from this position, the ratchet lever 26 is upwardly raised, as shown in FIG. 14. The pawl 27 is raised with rotating counterclockwise so as to engage the carrier gear 14. In this state, when the carrier gear 14 rotates in the direction withdrawing the seatbelt, i.e., clockwise as indicated by an arrow in the drawing, the end of the engagement part 27c is brought into engagement with the teeth of the carrier gear 14, so that the pawl 27 rotates about the rotating shaft part 26a. However, because the upper right end of the slotted hole 27b abuts against the supporting shaft 31, the pawl 27 does not furthermore rotate. The rotation of the carrier gear 14 is stopped in this state, resulting in preventing the spool from rotation in the direction withdrawing the seatbelt.

On the other hand, when the spool is driven in the retracting direction in this state, a state shown in FIG. 15 is established. That is, when the carrier gear 14 rotates counterclockwise as indicated by an arrow in the drawing, the teeth of the carrier gear 14 pushes the engagement part 27c of the pawl 27. Therefore, the pawl 27 rotates clockwise about the rotating shaft part 26a against gravity, as indicated by an arrow in the drawing, and comes to a state that the lower left side of the slotted hole 27b abuts against the supporting shaft 31. As a result, in the retracting direction of the spool, the carrier gear 14 can rotate freely. The ratchet teeth 14b of the carrier gear 14 is depicted as being away from the engagement part 27c of the pawl 27 in the drawing due to inertia of the pushing force of the ratchet teeth. However, the teeth of the carrier gear 14 will soon come to contact with the engagement part 27c of the pawl 27 and can not be left separated therefrom because a counterclockwise rotational force due to gravity is always applied to the pawl 27. Accordingly, when the carrier gear 14 starts to rotate clockwise from the state shown in FIG. 15, the state shown in FIG. 14 will be promptly achieved.

As described above, when the piston 24a of the solenoid 24 is extended, the spool can rotate freely. When the piston 24a of the solenoid 24 is retracted, despite that the spool can rotate in the direction retracting the seatbelt, it can not rotate in the withdrawing direction.

In addition to the embodiment, by engaging and disengaging between the pawl and the ratchet teeth 14b of the carrier gear 14 using the rotational force of the motor 8 itself in a mechanism as shown in FIG. 3, the carrier gear 14 can rotate only in the retracting direction. In such a case, switching on and off the power transmission route between the motor and the spool can be performed simultaneously with controlling the rotational direction of the spool by utilizing the rotational power of the motor 8.

In order to switching on and off the power transmission route between the motor and the spool, it is apparent to those skilled in the art that such ratchet mechanisms as shown in FIGS. 7 through 15 can be used as a ratchet mechanism for switching the power transmission route, in which the rotation of the internal gear in one direction is stopped or the rotation in both directions is allowed, except such mechanisms as shown in FIGS. 3 through 6, in which the lever spring 22 and the retaining lever 21 are used.

An example of the operations of a seatbelt retractor according to the embodiment of the present invention constructed as above will be described below. In this embodiment, in a normal state, the power transmission route between the motor and the spool is turned off by the switching mechanism of the power transmission route. Retraction of the seatbelt is performed by a coil spring. Therefore, when withdrawing the seatbelt, an occupant can withdraw the seatbelt only by a force against the force of the coil spring.

When a signal predicting possibility of an accident such as a collision is sent from a collision predicting device, a seatbelt retracting controller connects the power transmission route between the motor and the spool by means of the switching mechanism of the power transmission route simultaneously with driving the motor in the direction retracting the seatbelt. This may be spontaneously performed by driving the motor in the direction retracting the seatbelt, as described in the embodiment above. Accordingly, the rotating force of the motor is transmitted to the spool so as to retract the seatbelt with the spool. The retracting the seatbelt is started when the predicting signal is received and not after the occurrence of a collision in fact as conventionally performed, so that an occupant can be securely restricted in a seat.

The seatbelt retracting controller actuates a ratchet mechanism simultaneously with driving the motor so as to allow the spool to be driven only in the direction retracting the seatbelt. Therefore, even when a force to withdraw the seatbelt (generated by an actual collision, for example) may be applied thereto during the retraction of the seatbelt, the seatbelt can not be withdrawn.

When an accident such as a collision does not occur after all, the ratchet mechanism is released simultaneously with stopping the motor, so that the spool can be freely rotated, enabling an occupant to readily withdraw the seatbelt.

As described above, when a seatbelt retractor according to the present invention is used, the locking mechanism can be rapidly operated upon occurrence of an emergency, while the seatbelt retractor will not cause uncomfortable feeling or unpleasantness due to unnecessary locking when an occupant tries to withdraw the seatbelt.

While the invention has been explained with reference to the specific embodiments of the invention, the explanation is illustrative and the invention is limited only by the appended claims.

What is claimed is:

1. A seatbelt retractor, comprising:
   a motor,
   a belt winding spool connected to the motor,
   a power transmission route interposed between the motor and the spool,
   a switching mechanism connected to the power transmission route for connecting and disconnecting the same, said switching mechanism connecting the power transmission route from the motor to the spool only when the motor rotates in a retracting direction, and
   a ratchet mechanism including a ratchet gear connected to the spool and having external teeth, a pawl situated adjacent to the ratchet gear to be engageable with the teeth of the ratchet gear, and electric driving means connected to the pawl for driving the pawl to engage one of the teeth of the ratchet gear, said ratchet mechanism allowing the spool to rotate only in the retraction direction when the pawl engages one of the teeth, and allowing the spool to rotate in retracting and withdrawing directions when the pawl does not engage one of the teeth.

2. A seatbelt retractor according to claim 1, wherein said switching mechanism is connected to and driven by the motor for turning on the transmission route.

3. A seatbelt retractor according to claim 1, wherein said power transmission route includes a power transmission gear mechanism, and the switching mechanism includes a rotatable control lever for controlling operation of the switching mechanism.

4. A seatbelt retractor according to claim 3, wherein said power transmission route includes a reduction mechanism, said reduction mechanism including:
   a sun gear connected to one of the motor and the spool, a ring-shaped internal gear having ratchet teeth at an external periphery and internal teeth on an internal periphery thereof, planetary gears connected to the other of the motor and the spool and engaging the sun gear and the internal gear, a carrier for supporting the planetary gears and transmitting revolution of the planetary gears to the spool, and a reduction gear connected to said one of the motor and spool, and rotated integrally with the sun gear to receive rotation of the motor from the power transmission gear mechanism.

5. A seatbelt retractor according to claim 4, wherein said switching mechanism includes a retaining lever switchable between positions disengaged from and engaged with the ratchet teeth of the ring-shaped internal gear.

6. A seatbelt retractor according to claim 1, wherein said ratchet mechanism further includes an elastic body connected between the pawl and the electric driving means for driving the pawl, said teeth of the ratchet gear being saw-blade teeth.

7. A seatbelt retractor according to claim 1, wherein said ratchet mechanism further includes a ratchet lever connected to the pawl and having a rotational pivot for pivoting the pawl, said driving means being connected to the ratchet lever for controlling the pawl.

8. A seatbelt retractor according to claim 7, further comprising a housing having a hole, said pawl having a pin fitted into the hole.

9. A seatbelt retractor according to claim 8, wherein said ratchet mechanism further includes an elastic body attached to the pawl for urging the pawl to the ratchet gear.

10. A seatbelt retractor according to claim 1, wherein said electric driving means is a solenoid adapted to be actuated when a vehicle is expected to be involved in an accident.

11. A seatbelt retractor according to claim 1, wherein said motor and the electric driving means are actuated simultaneously when the motor retracts the belt.

* * * * *